April 30, 1935.                J. H. FOX ET AL                1,999,588
                    APPARATUS FOR ANNEALING WINDOW GLASS
                      Filed March 17, 1933     5 Sheets-Sheet 5
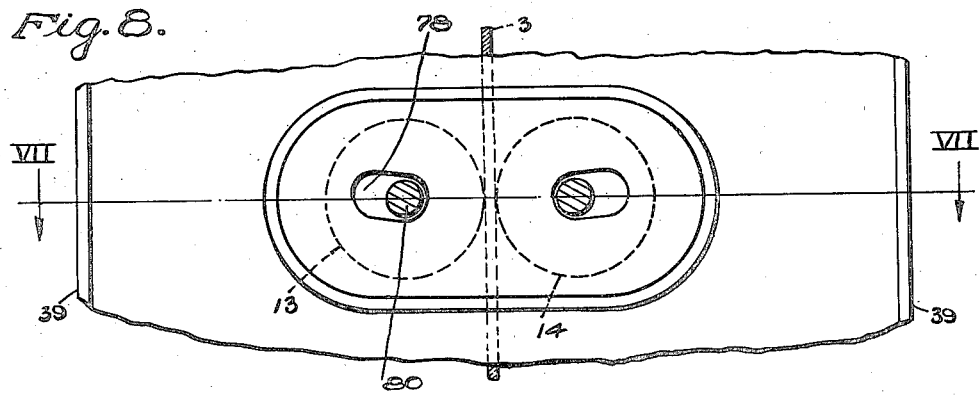
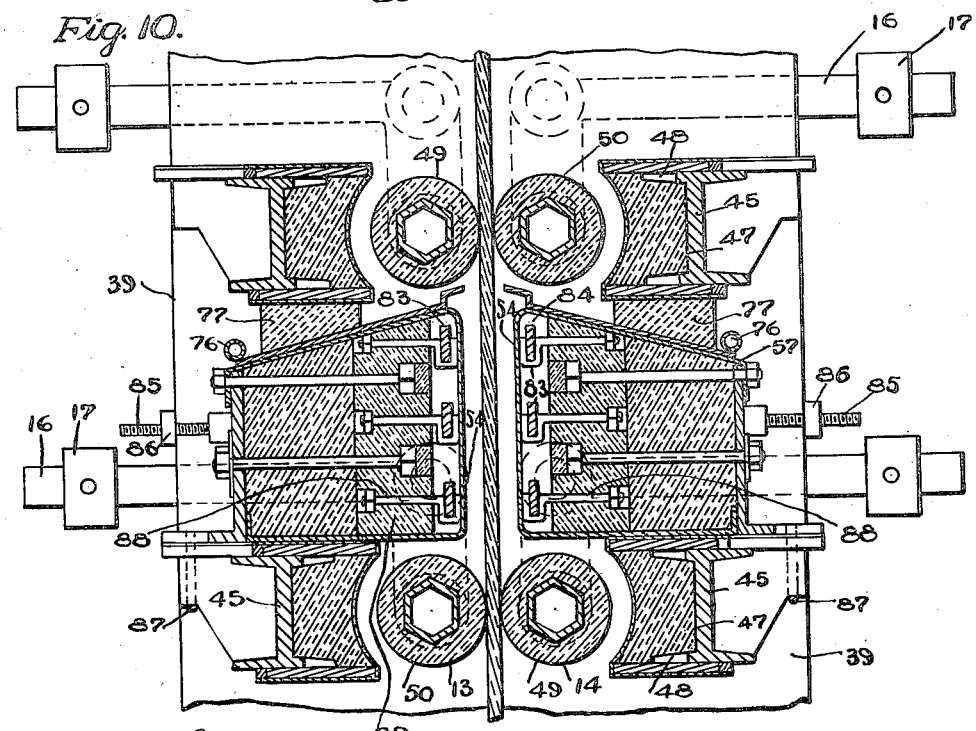
INVENTORS
J. H. Fox and
BY K. G. Kutchka
Bradley & Bee
ATTORNEYS

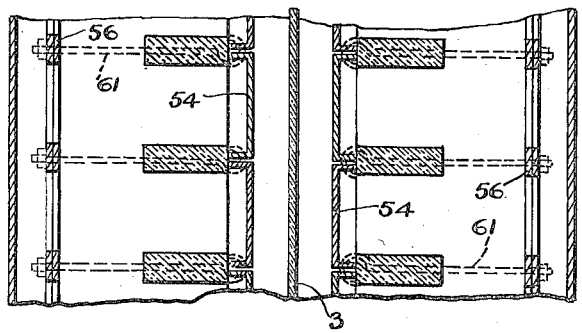
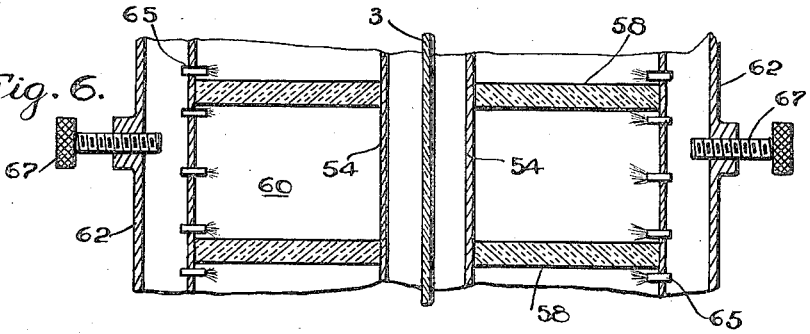
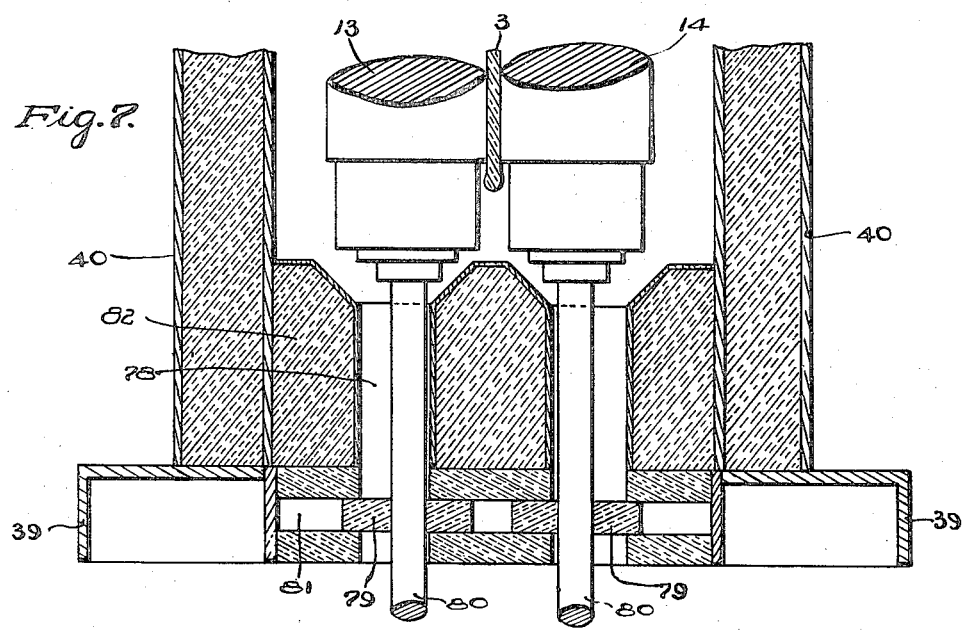

UNITED STATES PATENT OFFICE 1,999,588

APPARATUS FOR ANNEALING WINDOW GLASS

John H. Fox, Pittsburgh, and Karl G. Kutchka, Wilkinsburg, Pa., assignors to Pittsburgh Plate Glass Company, a corporation of Pennsylvania Application March 17, 1933, Serial No. 661,306

6 Claims. (Cl. 49—47)

Figure 1:
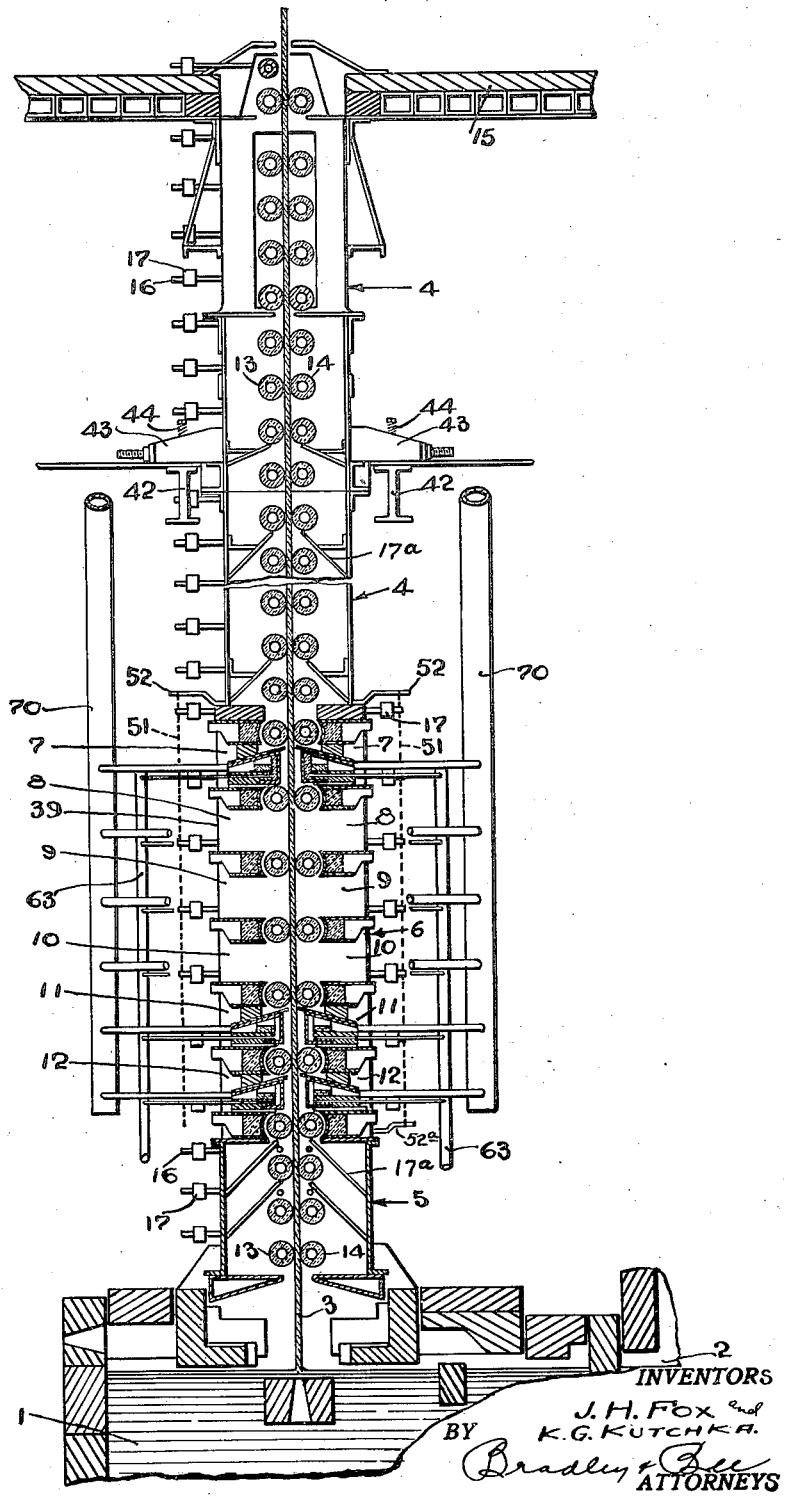
Figure 2:
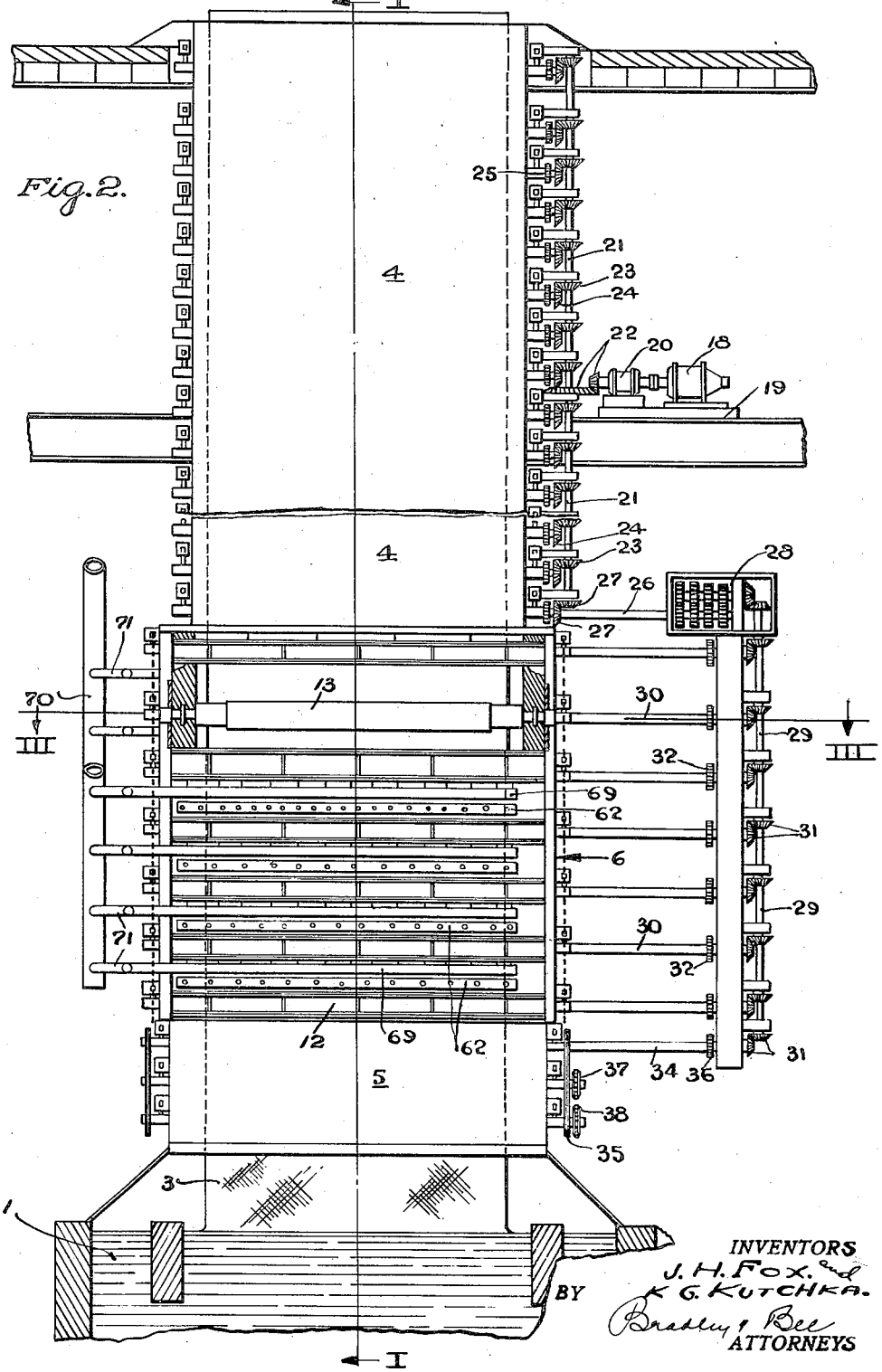
Figure 3:
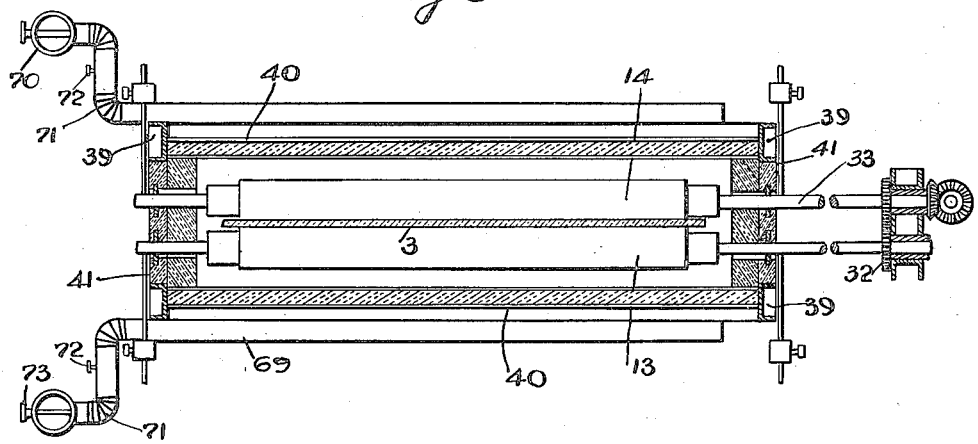
Figure 4:
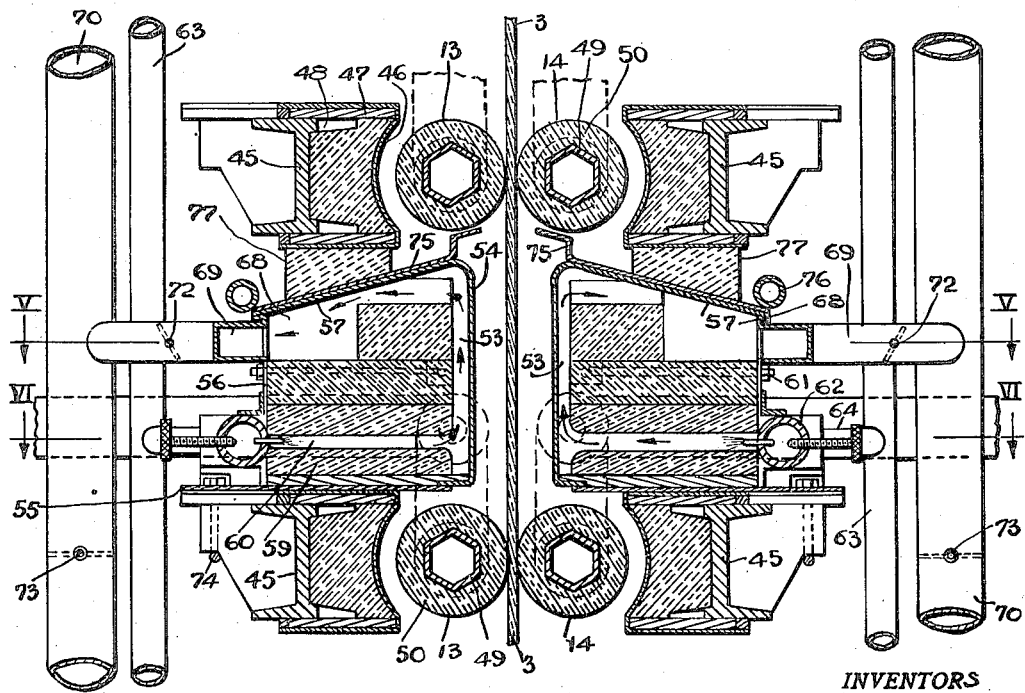

The invention relates to an apparatus for annealing vertically drawn window glass in apparatus of the Fourcault or Slingluff type, in which the glass passes upward through a vertical leer casing provided with drawing rolls and separated into compartments by sets of baffles in order to provide for a decreasing temperature from the lower to the upper end of the casing. In the use of such an apparatus the glass is often poorly annealed and difficult to cut particularly at the edges of the sheet where the glass is too hard, having what is often referred to as too much temper. The purpose of the present invention is to remedy the difficulty. Briefly stated, this is accomplished by inserting intermediate the ends of the casing adjacent the lower end thereof an improved reheating and annealing section in which the glass is first brought to a uniform temperature from edge to edge (below) 1200 deg. F. which is the approximate settling point of the glass, but somewhat above 1050 deg. F., which is the upper limit of the critical annealing range and then controlling the cooling of the glass as it drops in temperature through the critical annealing range which approximates 1050 degrees F. to 950 degrees F. After the glass has passed through this range, it is cooled in its passage through the leer in the usual way, as within reasonable limits a lack of uniformity in cooling from 950 deg. F. to the temperature at which it may be cut off and handled at the top of the leer, is unimportant. Glass thus treated is well annealed throughout the width of the sheet, and may be cut adjacent the edges of the sheet with no more difficulty than is experienced in cutting the sheet remote from the edges. This reduces the loss in cutting both in the factory and by the jobber, or ultimate consumer, who may find it necessary to recut or trim a sheet, in order to bring it to the desired dimensions. Bunsen burners are preferably employed for reheating the glass preliminary to annealing in the annealing unit, but it will be understood the invention in its broad aspect contemplates the use of any source of heat which may be available depending on the location and the cost. Certain embodiments of the apparatus are shown in the accompanying drawings, wherein:

Figure 1 is a vertical section on the line I—I of Fig. 2. Fig. 2 is a partial vertical section and partial side elevation. Fig. 3 is a section on the line III—III of Fig. 2. Fig. 4 is an enlarged section on the line I—I of Fig. 2. Figs. 5 and 6 are enlarged sections on the lines V—V and VI—VI respectively of Fig. 4. Figs. 7 and 8 are enlarged detail views, Fig. 7 being a section on the line VII—VII of Fig. 8. Fig. 9 is a detail showing the burner controlling means. And Fig. 10 is a section similar to that of Fig. 4 showing a modification in which electric heating means are substituted for the gas heating means of the preferred construction.

Referring to the general arrangement of parts as shown in Figs. 1, 2 and 3, 1 is a drawing extension or kiln connected to the glass melting tank 2, from which the sheet 3 is drawn continuously; 4 is the upper section of the leer in which the glass becomes cooled preliminary to cutting; 5 is the bottom section of the leer; and 6 is the annealing section of the leer located between the upper and lower sections 4 and 5 and made up in the present showing of six units 7, 8, 9, 10, 11, and 12, all similar in construction and shown in enlarged detail in Figs. 4 to 8. The drawing operation is initiated in the usual way by means of a bait which is lowered by a cable between the sets of drawing rolls, which are spread apart for this operation, such bait being dipped into the glass drawn upward through the leer, the drawing rolls being allowed to come together on the sheet after the bait has passed. After the bait has emerged from the top of the leer, it is cut off and the drawing operation is continued indefinitely by the rotation of the pairs of drawing rolls 13, 14. The glass as it emerges above the cut off floor 15 is cut into sections and taken away in the usual manner.

In the first part of the drawing operation before the sheet reaches the annealing section 6, such sheet is allowed to cool and reach a temperature lying between 900 and 1000 deg. F. When the sheet enters the annealing section 6, it is raised in temperature to a point above the critical annealing range, preferably between 1050 and 1100 deg. F. so that the glass still remains set, but is uniformly heated from edge to edge and throughout the thickness of the sheet. As the glass passes through the annealing units 12 to 7, it is allowed to cool gradually and uniformly to a temperature of approximately 950 deg. F. so that in this period in which the glass drops through the critical annealing range (ordinarily 1050 to 950 deg. F.) there is a slow and relatively uniform decrease in temperature which insures proper annealing of the glass. During its passage through the upper section 4 of the leer, the glass is allowed to drop in temperature to a point preferably below 200 deg. F. so that no difficulty is experienced in cutting the glass in sections and handling it after it passes above the cutting off floor 15.

In order to permit the passage of the bait in starting the operation as heretofore described, the left hand member 13 of each of the pairs of drawing rolls is mounted on a bell crank lever 16 so that it may be swung outward, the rolls being held yieldingly inward during the normal drawing operation by means of counterweights 17, this being a construction well known in the art. In the annealing section 6, the right hand rolls of each pair are also similarly mounted for movement in and out so that in this section, after the drawing operation is under way, both of the rolls 13 and 14 may be withdrawn from the sheet. This improves the operation during the critical period of annealing since no solid body contacts with the sheet and thus tends to modify its temperature. This is not an essential step in the operation, but is of assistance in making the temperature drop more uniformly as the sheet passes through the annealing section 6. It will be understood that during this period, the separation of the rolls in the annealing section may be made very slight so as not to permit too free a passage of the gases in the annealing section upward along the sheet from one section to the next one above. The upper and lower sections 4 and 5 of the leer are provided with the usual pairs of baffles 17a so as to divide the leer into a number of sections and permit of the control of the temperature in the various sections, which control could not be effected if there was a free flow of gas upward through the leer sections from one end to the other.

The driving of the rolls 13 and 14 is accomplished from the motor 18 (Fig. 2) seated upon the floor 19 and operating through the reducer 20 to drive the vertical shaft 21, this being accomplished through the bevel gears 22. This shaft 21 is provided with a series of beveled gears 23 which drive the bevel gears 24 on the rolls 14. The rolls 13 are driven from the rolls 14 by means of intermeshing spur gears 25 on the end of the rolls, this being a method of driving well known in the art. The rolls 13 and 14 in the annealing section 6 of the leer are driven from the shaft 26, which shaft is driven from the shaft 21 by the bevel gears 27. The shaft 26 operates through the speed change gears 28 to drive the vertical shaft 29. This shaft drives the rolls 13 in the annealing section 6 through the intermediary of the shafts 30 and the bevel gears 31. The rolls 14 are driven by means of the pairs of spur gears 32 carried at the ends of the shafts and at the ends of similar shafts 33 which are connected to the ends of the rolls 14 (Fig. 3). The rolls 13 and 14 in the bottom section 5 of the leer are driven from the shaft 34 which is connected to the upper roll 13 and by the chain 35 which passes around sprockets on the ends of the rolls 13 lying above the top roll. The rolls 14 are driven by means of the pairs of spur gears 36, 37 and 38.

The entire leer is supported from four vertical channels 39 (Fig. 3), to which are secured the side plates 40 and end members 41 which go to make up the casing. The weight of the casing is hung upon the I-beams 42, 42 (Fig. 1) by means of the screws 44 passing through the members 43 engaging the tops of the I-beams. The annealing section 6 lying between the upper section 4 and the bottom section 5 is supported from the vertical channels 39, 39 by means of pairs of transverse I-beams 45, 45 bolted or welded at their ends to the channels 39, 39.

Each of the beams 45, 45 acts as a support for one of the units 7, 8, 9, 10, 11 and 12 so that such units may be independently adjusted toward and from the sheet, this construction being most clearly shown in Figs. 4 to 6. In order to protect the beams from the heat, a shell 46 of heat resisting metal, such as nickel chromium, is provided in front of each beam with an interposed body of insulating material 47 in the space between the beam and the shell 46. In order to reduce the tendency of the beam to warp under heat, its flanges on the side toward the rolls are made in slotted form, as indicated at 48. The rolls 13 and 14 comprise the usual metal center shafts 49 covered with asbestos composition 50. As heretofore pointed out, both rolls 13 and 14 are mounted in bearings on bell crank levers 16 (best shown in Fig. 10) which carry weights 17 yieldingly pressing the rolls toward each other. When it is desired to separate all the pairs of rolls in the annealing section, the chains 51 on each side of the leer which are connected to all the levers 16 are pulled upward so as to bring the rolls out of contact with the sheet, the chain being held in this position by hooking one of its links over a suitable pin 52. When the rolls in the annealing section are in engagement with the glass, the rolls 14 are preferably held against movement, either in or out, so that they are kept in alignment with the fixed rolls 14 in the upper leer section 4. This is accomplished by hooking the chain 51 to the pins 52 and 52a (Fig. 1). At this time the rolls are barely out of contact with the glass so as not to permit any substantial amount of heated air to pass along the sheet from one unit to the next unit.

Slidably mounted upon each of the beams 45 is a heating unit. This heating unit consists of an elongated chamber 53 having its front face made up of metal plates 54, preferably of heat resisting metal, such as nickel chromium. The plates 54, together with the bottom plates 55, and the back plates 56 constitute a box rectangular in cross section except that the top 57 is at an angle, as indicated in Fig. 4. This box is divided longitudinally into sections by means of the plates 58 (Fig. 6) and carries along its lower side a block 59 provided with burner slots 60. In order to reduce any warpage due to heat, the face 54 of the box is made up of sections having their meeting vertical edges turned to the rear and spaced slightly apart, as shown in Fig. 5. These flanges are engaged by hooks 61 secured at their rear ends to the back plate 56 of the box, thus holding the front plates 54 in their proper relative position, but free to expand and contract independently. Extending along the edge of the burner slot 60 at the back of the unit is a gas supply pipe 62 connected to the vertical supply pipes 63 by means of the cross connections 64. The cross connections are preferably arranged telescopically with respect to the pipe 62 so that the heating unit may be adjusted in and out to vary the position of the front face thereof with respect to the glass sheet. The pipe 62 is provided on its front side with a plurality of burner tips 65 directed into the burner slots 60 and the flow through each burner tip may be regulated by means of the screw 66 shown in Fig. 9. The flow of gas longitudinally of the pipe 62 may be regulated by means of other screws 67, as shown in Fig. 6. By means of the screws 66 and 67 the flow of gas longitudinally of the slot 60 may be regulated to meet requirements, which regulation will ordinarily involve the application of more heat at the edges of the sheet than at the center. By proper adjustment of the heat across the width of the sheet, such sheet may be brought to uniform temperature from edge to edge and any tendency to warp thus avoided. The division of the slot 60 longitudinally by means of the plates 58 (Fig. 6) assists materially in this regulation. The vertical pipe 63 is supplied with pre-mixed gas and air and it will be understood that the construction of the units on each side of the sheet of each unit throughout the annealing section is the same. The burning gases which pass through the slot 60 turn upward at the front end of the slot as indicated by the arrows in Fig. 4, passing through the narrow chamber 53 and then to the rear through the passage 68 which is connected to the vertical outlet stack 70 by means of the flexible connections 71. Suitable dampers 72 and 73 are provided (Fig. 4) for regulating the flow of gases from the units. Each unit is mounted for sliding bodily movement in and out and is clamped in position by means of bolts 74, thus giving an additional means of regulating the heat applied from the plates 54 to the glass sheet moving upward between such plates.

To regulate the amount of heat which flows upward from one unit to the next unit, the dampers 75 are provided, such dampers being in the form of plates of heat resisting metal provided at their ends with handles 76 and projecting at their front ends to a point adjacent the glass sheet. By adjusting these dampers along the inclined plates 57, the flow of heated gas along the sheet may be regulated to meet requirements. To further regulate the temperature of each unit, tapering blocks 77 of refractory material are placed between the dampers and the metal shell thereabove. These blocks are shown in closed position in Fig. 4, but may be adjusted to the rear to give regulated outlet openings which permit an outflow of heated gas or an inflow of cool air which in either case tends to reduce the temperature in the unit located above the blocks.

In order to permit the rolls to be adjusted toward and from each other and at the same time prevent an escape of gases through the slots which must be provided for the roll shafts, the expedient illustrated in Figs. 7 and 8 is employed. As here shown, the slots 78 are closed at their outer ends by means of the discs 79 carried by the roll shafts 80 and fitting slidably in the slots 81. Insulation 82 is provided at the ends of the rolls in order to reduce the heat losses.

In operation the glass sheet 3 enters the bottom unit 12 of the reheating and annealing section of the leer at a temperature of about 950 deg. F., and while passing through this unit is heated to a temperature slightly above 1050 deg. F., the heat being so applied that the sheet is heated uniformly throughout to the desired temperature. The successive units 11, 10, 9, 8 and 7 have their gas supply and dampers so regulated that a gradually decreasing temperature is provided in the successive units so that the glass emerges from the unit 7 at a temperature slightly under 950 deg. F. The annealing section thus provides for a gradual and uniform drop of temperature in the sheet while it is passing through the critical annealing range of 1050 deg. F. to 950 deg. F. and a proper regulation of the temperature drop during this stage of the annealing insures that the glass will be properly annealed regardless of what happens in the temperature drop after the sheet passes into the upper section 4 of the leer. The provision of the change speed mechanism 28 which controls the peripheral speed of the rolls 13 and 14 in the leer sections 5 and 6 permits of a control of the speed of draw so as to avoid any tendency of the sheet to buckle due to any expansion or stretching which occurs after the sheet enters the annealing section of the leer. The drive is so regulated that the peripheral speed of the rolls 13 and 14 in the upper section 4 of the leer is slightly greater than that of the rolls in the sections 5 and 6. This may involve a slight amount of slippage of the rolls upon the glass in the upper section, but insures that any slack due to expansion will be taken up.

Fig. 10 illustrates a modification of the invention in which electrical heat is substituted for the gas heat of the construction of Figs. 1 to 9. In other respects the construction follows that of Figs. 1 to 9 and the same reference numerals are used throughout. The units have the same general construction except that the resistance bars 83 are placed in the chambers 84 behind the plates 54 to give the necessary heat and the gas connections and burners of the preferred construction are, of course, omitted. The bolts 85 extending through lugs 86 carried by the channels 39 serve as a means for adjusting the units toward and from the glass to regulate the heat applied, the units being clamped in adjusted position by means of the bolts 87. The heating bars 83 are preferably made of a nickel chromium composition suitable for the purpose and are supported in hook members 88 carried by the insulating blocks 89. In this construction as well as that of Figs. 1 to 9, the rolls 13 and 14 are preferably withdrawn slightly from the glass after the drawing operation is initiated in order to free the sheet from the effect of contact with solid bodies which tend to interfere slightly with proper annealing. The provision of the chambers with the bars 83 located back of the plates 54 serves to give a more uniform application of the heat than if the plates 54 were not interposed between the bars and the glass sheet.

What we claim is:

1. Apparatus for drawing a glass sheet vertically from a bath of molten glass and annealing it, comprising a vertical casing, provided with a plurality of pairs of driven rolls spaced along the length of the casing and adapted to frictionally engage the sheet, said casing being made up of a bottom section adjacent the bath, a top section spaced above the bottom section and an intermediate section made up of a plurality of units lying one above the other and independently heated, and means whereby the rolls in the intermediate section may be withdrawn from contact with the sheet after the drawing operation is initiated.

2. Apparatus for drawing a glass sheet vertically from a bath of molten glass and annealing it, comprising a vertical casing provided with a plurality of pairs of driven rolls spaced along the length of the casing and adapted to frictionally engage the sheet, said casing being made up of a bottom section adjacent the bath, a top section spaced above the bottom section and an intermediate section made up of a plurality of insulated units lying one above the other and independently heated, and means whereby the rolls in the intermediate section may be withdrawn from contact with the sheet after the drawing operation is initiated.

3. Apparatus for drawing a glass sheet vertically from a bath of molten glass and annealing it, comprising a vertical casing provided with a plurality of pairs of drawing rolls spaced along the length of the casing and adapted to frictionally engage the sheet, said casing being made up of a bottom cooling section adjacent the bath, a top cooling section spaced above the bottom section, and an intermediate insulated section provided with means at its lower end for reheating the sheet to a temperature throughout its width above 1050 degrees F., means for driving the rolls, means for supporting the rolls in the intermediate section so that the members of each pair are movable in and out and are yieldingly pressed inward, and means for holding each of said rolls in outer position out of contact with the glass sheet.

4. Apparatus for drawing a glass sheet vertically from a bath of molten glass and annealing it, comprising a vertical casing provided with a plurality of pairs of driven rolls spaced along the length of the casing and adapted to frictionally engage the sheet, and a heating unit interposed in the casing at its lower portion between two of said pairs of rolls, and comprising a flat chamber on each side of the plane of the sheet having a metal face, heating means for each chamber, and means whereby each chamber may be adjusted toward and from the other chamber.

5. Apparatus for drawing a glass sheet vertically from a bath of molten glass and annealing it, comprising a vertical casing provided with a plurality of pairs of driven rolls spaced along the length of the casing and adapted to frictionally engage the sheet, and a heating unit interposed in the casing at its lower portion between two of said pairs of rolls, and comprising a flat chamber on each side of the plane of the sheet having a metal face and a back of insulating material, means for supplying a heated gas at the lower end of each chamber, means for withdrawing the gas from the upper ends of the chambers, a pair of metal supporting beams for the units opposite the pair of rolls just below the unit, plates of heat resisting metal interposed between the rolls and the beams, and insulating material in the spaces between the beams and the plates.

6. Apparatus for drawing a glass sheet vertically from a bath of molten glass and annealing it, comprising a vertical casing provided with a plurality of pairs of driven rolls spaced along the length of the casing and adapted to frictionally engage the sheet, and a heating unit interposed in the casing at its lower portion between two of said pairs of rolls, and comprising a flat chamber on each side of the plane of the sheet having a metal face and a back of insulating material, means for supplying a heated gas at the lower end of each chamber, means for withdrawing the gas from the upper end of the chamber, an outlet from the casing just above each chamber in the form of a wedge-shaped opening, a tapering block for adjustably closing said opening, and damper plates upon which said blocks are supported extending inward past the inner faces of said chamber and adjustable in and out to regulate the flow of air upward to the casing above the unit.

JOHN H. FOX.
KARL G. KUTCHKA.